Oct. 2, 1928.
A. LEIB
1,685,821
DIRECTION FINDER
Filed April 29, 1924     6 Sheets-Sheet 2
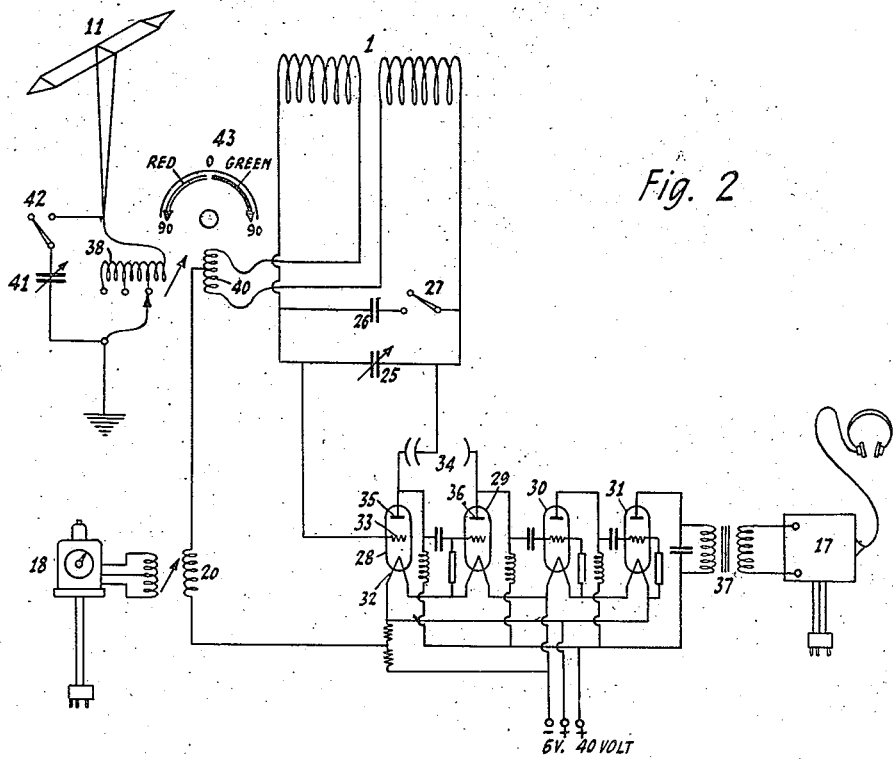
Fig. 2
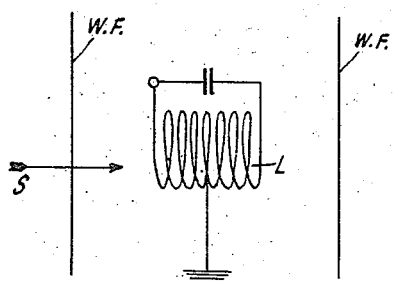
Fig. 3
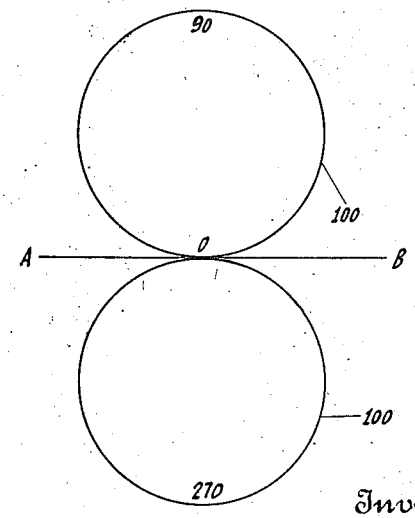
Inventor
AUGUST LEIB
By his Attorney Ira J. Adams Oct. 2, 1928.
A. LEIB
1,685,821
DIRECTION FINDER
Filed April 29, 1924   6 Sheets-Sheet 3
Fig. 4
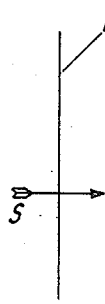
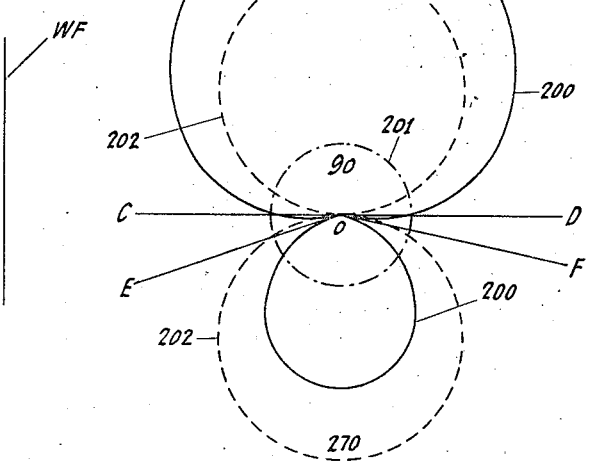
Fig. 5
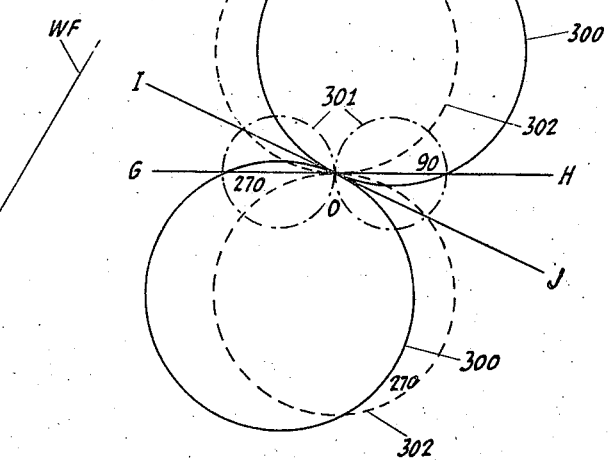
Inventor
AUGUST LEIB
By his Attorney Oct. 2, 1928.

A. LEIB

DIRECTION FINDER

Filed April 29, 1924   6 Sheets-Sheet 4

Inventor
AUGUST LEIB
By his Attorney

Oct. 2, 1928.  
A. LEIB  
1,685,821  
DIRECTION FINDER  
Filed April 29, 1924    6 Sheets-Sheet 5
Fig. 8
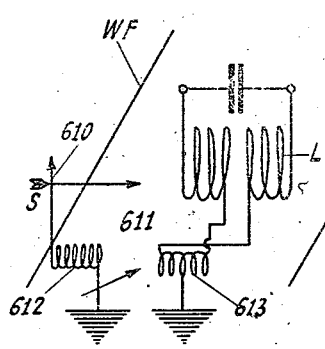
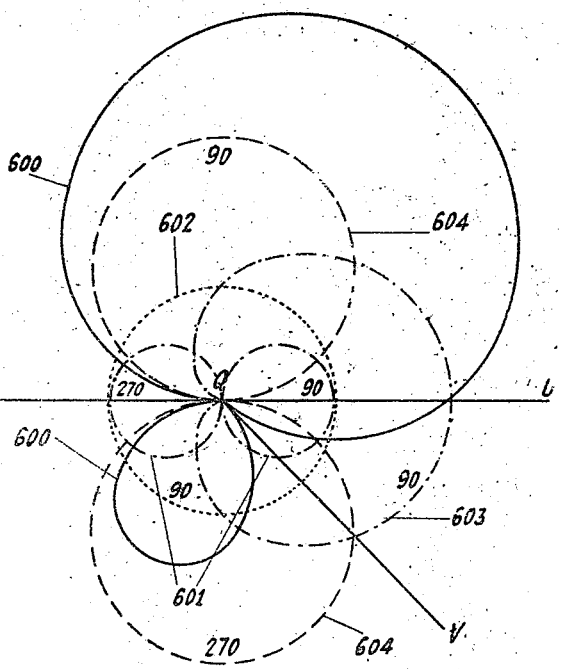
Fig. 9
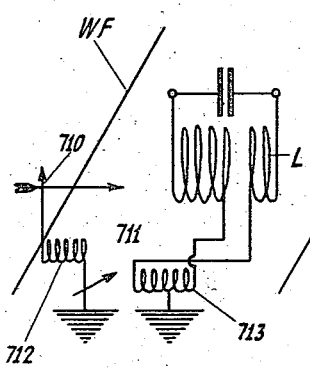
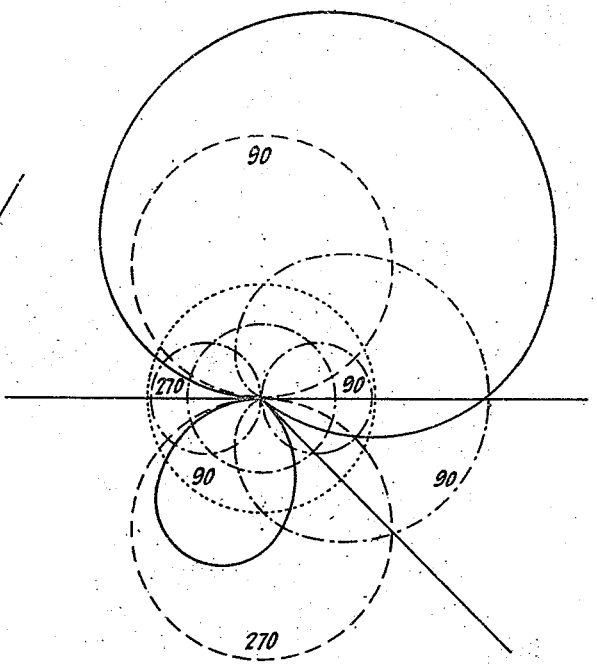
Inventor  
AUGUST LEIB  
By his Attorney Ira J. Adams Oct. 2, 1928.
A. LEIB
1,685,821
DIRECTION FINDER
Filed April 29, 1924      6 Sheets-Sheet 6
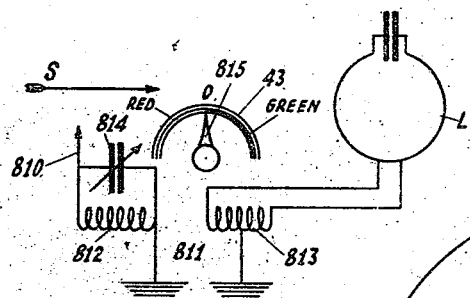
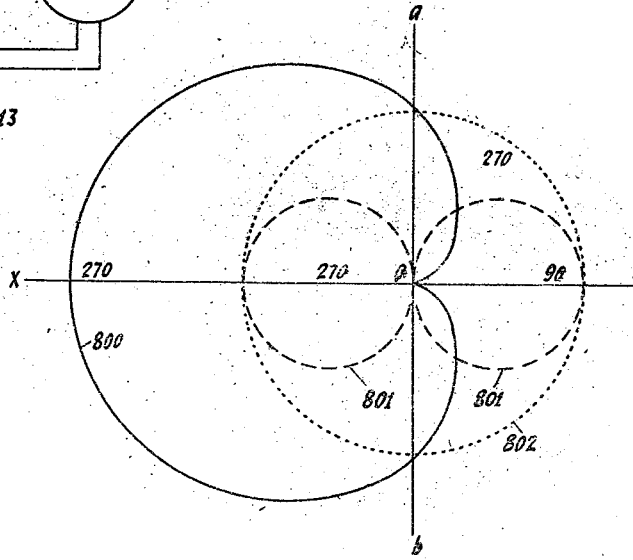
Fig. 10
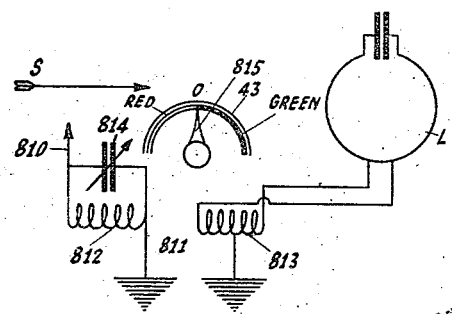
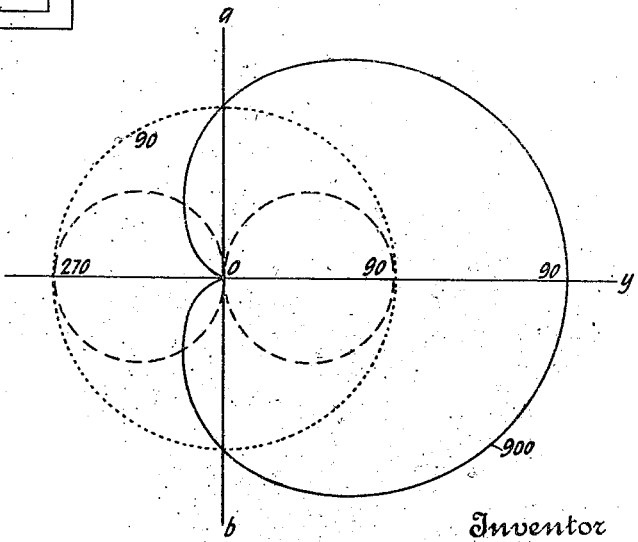
Fig. 11
Inventor
AUGUST LEIB
By his Attorney Patented Oct. 2, 1928.

1,685,821

UNITED STATES PATENT OFFICE.

AUGUST LEIB, OF BERLIN, GERMANY, ASSIGNOR TO GESELLSCHAFT FÜR DRAHTLOSE TELEGRAPHIE M. B. H., OF BERLIN, GERMANY, A CORPORATION OF GERMANY.

DIRECTION FINDER.

Application filed April 29, 1924, Serial No. 709,819, and in Germany April 19, 1923.

This invention relates to means for finding the direction of a station transmitting wireless signals and more particularly to a device of this kind employing a rotatable loop aerial in conjunction with a fixed undirectional aerial.

An object of the invention is to provide a device which will point accurately in the direction of the transmitting station under all conditions of wave front so long as the direction of wave propagation continues in a straight line. A further object of the invention is to provide a device which will provide a distinct minimum in the detecting apparatus when the axis of the loop is in line with the transmitter. A further object is to provide means whereby the sense of the direction of the transmitter can also accurately and easily be found.

Other objects will be apparent from the following specification and drawings.

One method for determining the direction of a transmitting station employs the combination of directional and non-directional aerials. A second method employs auxiliary aerials together with loop aerials in order to eliminate the simple aerial effect disturbing one or the other receiving minimum. The first method has been mostly used in connection with immovable cross aerials or, cross loop aerials, and the direction was determined by means of goniometers. The second method was employed mainly in conjunction with loop direction finders capable of being turned. Solely capacitive couplings of the auxiliary aerial to the direction finder in the latter method have been used because it was necessary to eliminate every additional coupling coil in order not to displace the receiving minima.

The working and effect of both mentioned methods are inaccurate. The goniometer direction finders have many windings pointing to the magnetic field and by these windings a minimum results which in general does not coincide with the real minimum. Besides the goniometer arrangements always require several circuits by which the receiving effects resulting from the magnetic field and the electric field are combined, so that an alteration of one of these effects alters the position of the receiving minima. Furthermore the disturbing aerial effect cannot be accurately compensated by reason of the mentioned circuits. The direction could be accurately determined by means of loop aerials and capacitively coupled auxiliary aerials, but the working was difficult because every correction of the auxiliary aerial altered the syntony of the loop circuit by reason of the unalterable coupling across the condenser. Therefore this apparatus is very difficult to work. Furthermore it is impossible to find the direction of the transmitter by means of a loop aerial alone as the axis points to two opposed directions.

The present invention relates to a direction finder which eliminates all the mentioned difficulties and guarantees an accurate determining of direction.

For an illustration of the manner of practicing my invention, reference is to be had to the accompanying drawings, in which:

Fig. 2 shows a schematic wiring diagram of the manner in which the apparatus is connected according to my invention.

Figs. 3–11 inclusive show schematic wiring diagrams illustrating the operating principles of my invention, each wiring diagram being accompanied by curves representing the energy received at different angles of incidence of the waves on the apparatus shown in the wiring diagram.

Figure 1:
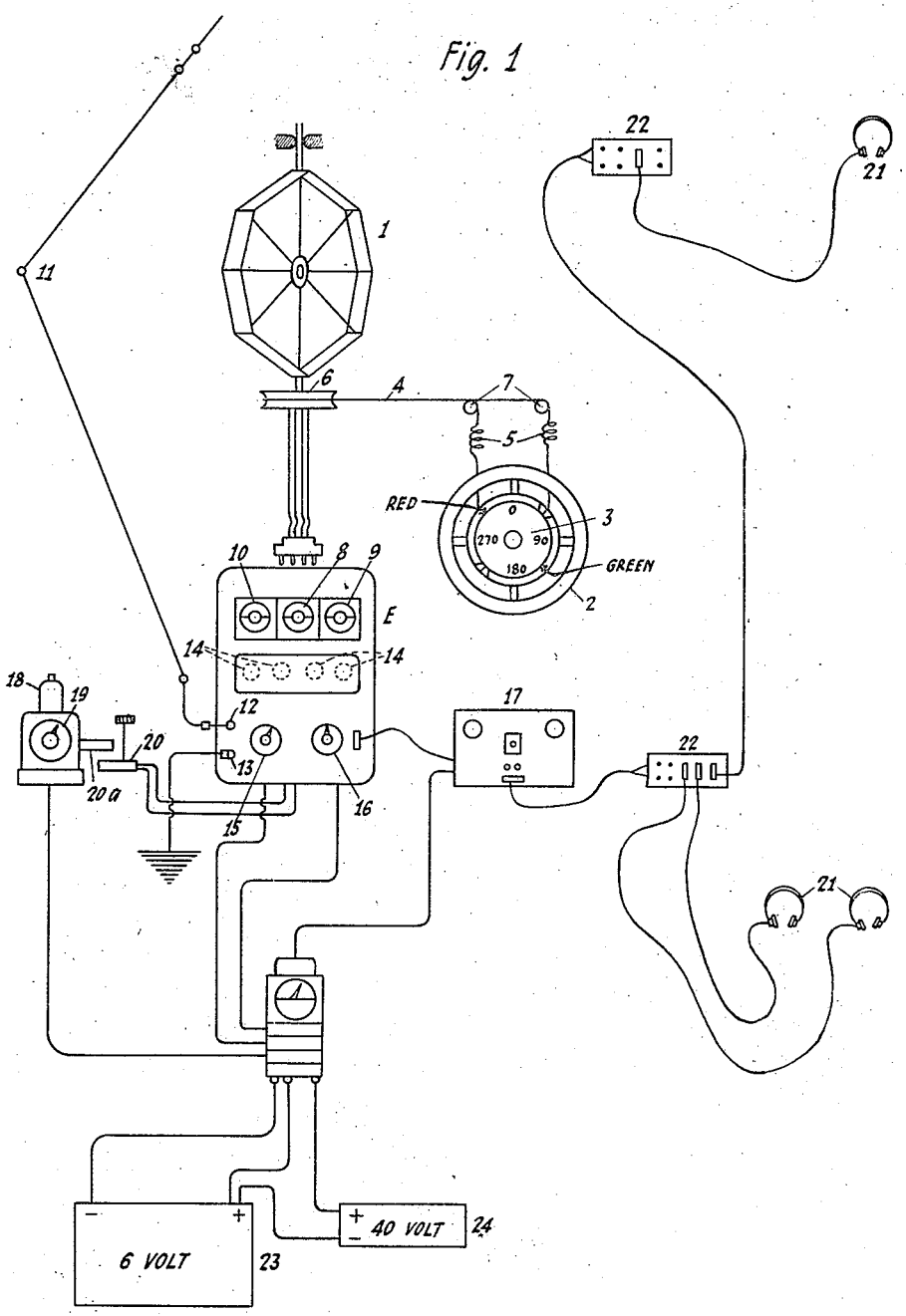
Fig. 1 shows a diagrammatic view of the entire apparatus used in the practice of my invention.

Referring to Fig. 1, 1 is a small loop aerial of an area of about ½ to 1 square meter and capable of being turned about a vertical axis. 2 is the adjusting device and 3 a stationary scale for this loop aerial which is turned by means of a wire-rope 4 extended by springs 5 and guided by pulleys 6 and 7. This construction has the advantage that the loop aerial can be placed at a suitable spot, for instance, in a screening or shielding box on deck of a ship, whilst the adjusting device 2 and the receiving apparatus are arranged in a closed room under deck. In order to avoid end-play, the wire-rope 4 is strained by means of the springs 5 led in parallel, so that the distance between loop aerial 1 and its adjusting device 2 cannot cause wrong readings from the scale 3. The receiver is shown under the loop aerial. 8 is the knob of the tuning condenser for the loop aerial wave; on the right is the tuning knob 9 for the coupling reaction and on the left the tuning knob 10 for the auxiliary aerial 11. The auxiliary aerial 11 itself is a simple wire of 10 to 16 meters in length, freely extended at a certain distance from the loop aerial 1, for which a connection terminal 12 is arranged on the left side of the receiver. The connection terminal 13 for the earth wire of the auxiliary aerial 1 is shown below the terminal 12. The four vacuum tubes 14 of the radio frequency amplifier are located in the middle of the receiver. The handle 15 of the switch for the auxiliary aerial 11 is drawn below on the left, and on the right is the adjusting handle 16 for the coupling between frame aerial 1 and auxiliary aerial 11. The receiver is connected to an audio frequency amplifier 17, drawn on the right of the receiver. On the left of the receiver there is a heterodyning circuit 18, inductively coupled to the receiver. The wave of this heterodyning circuit is adjusted by means of the handle 19 of a condenser and exchangeable coils. The coupling of the heterodyning circuit is regulated by a small coil 20 capable of being turned relative to fixed coil 20ª. The audio frequency amplifier is supplied with one or more telephones 21 connected thru one or more junction boxes 22. It is advisable to provide ships with a further telephone for the rudder, so that, it need be, the ship can be steered by means of this telephone. The heating current for the vacuum tubes of all apparatus is supplied by one 6 volt battery 23 and another battery 24 of about 40 volts furnishes the voltage for all plate-filament circuits.

Figure 2 shows a schematic diagram of the connections of the arrangement. In the middle of the windings of the loop a coupling coil 40 is inserted, and the terminals of the windings are connected to the variable tuning condenser 25. The range of wave lengths can be increased, for instance, by means of a fixed condenser 26 which can be connected in parallel to condenser 25 by a switch 27. For determining the direction of a transmitting station this circuit is first tuned to that wavelength. The loop aerial circuit is connected to the radio frequency amplifier. The example of the schematic connection shows three radio frequency vacuum tubes 28, 29, 30 and one audio frequency tube 31. The incandescent cathode 32 of the vacuum tube 28 of the radio frequency amplifier is connected to the middle of the loop aerial coupling coil 40 across the coupling coil 20 of the heterodyning circuit 18. The grid 33 of the vacuum tube 28 of the radio frequency amplifier is connected to one end of the frame winding 1, while the other end of these windings can be capacitively connected and regulated across a double variable rotatable condenser 34 either to the plate 35 of the vacuum tube 28 or plate 36 of the tube 29. This double variable rotatable condenser 34 regulates the coupling reaction, as this reaction included in the given connection has a too strong coefficient of coupling. By altering capacity and phase, the coupling reactions can be adjusted to the most favorable valves by means of the mentioned coupling reaction regulator. The phase of the plate-filament circuit of the first vacuum tube is 180° different in phase from that of the loop aerial circuit. If the loop aerial is coupled to the plate 35 of the vacuum tube 28 the coupling reaction is increased. On the other hand, the coupling reaction is decreased, if according to the changeable connection the loop circuit is connected to the plate 36 of the vacuum tube 29, as these circuits are equi-phased. This already known method has the great advantage that the highest degree of sensitiveness and selection is attained by using the coupling reaction for reducing the damping and for amplifying the radio frequency, because the loop circuit can be practically considered a sufficiently symmetrical arrangement with regard to disturbing aerial currents. A further amplification can be attained by coupling the receiver with an audio frequency amplifier 17 by means of transformer 37. Furthermore it is advisable to use a heterodyning circuit 18, as the heterodyne method generates a beat-tone in case of undamped oscillations, so that the loop aerial circuit can be accurately tuned to the receiving wave. The receiving energy of spark transmitters which is very small when the loop aerial is adjusted to the receiving minimum, is very much amplified by the application of the heterodyne method. The auxiliary aerial 11 serves for correcting the receiving minima and also for producing a cardioid having but one meaning. This auxiliary aerial has a subdivided coil 38 connected therewith by which the coefficient of coupling with coil 40 can be altered. The condenser 41 can be put in circuit by means of the switch 42 in order to tune the auxiliary aerial 11 for producing the cardioid. This syntony increases the receiving effect of the auxiliary aerial which can be of small dimensions. This cardioid can also be produced by means of an untuned but larger auxiliary aerial. The double-sided minimum can also be corrected by means of a small tuned auxiliary aerial if a loose coupling is employed. The transference of energy from the auxiliary aerial 11 to the loop circuit is regulated from one maximum coefficient of coupling across a minimum to a second maximum by turning the coupling coil 40. These coupling maxima have opposite phases. Instead of altering the coefficient of coupling for instance by means of a coil capable of being turned, the damping of the auxiliary aerial can be altered by means of a regulating resistance. In this case a reversing switch is necessary in order to be able to replace the one phase by the opposite.

In order that the working of the apparatus shall be simple, it is necessary that the transfer of energy from the auxiliary aerial 11 to the loop aerial 1 shall not generate disturbing reactions, as for instance, alterations of syntony, decompositions of waves and similar processes. Therefore, the present invention employs a very loose coupling between auxiliary aerial 11 and loop aerial 1. The auxiliary aerial is chosen rather large so that it supplies the loop aerial with sufficient energy in spite of loose coupling. In order to be able to find the direction of a transmitter, the receiving operator must know exactly that position of the coupling coil 40 in which practically no energy is transferred from the auxiliary aerial 11 to the loop aerial 1. This position of the coupling coil 40 is marked by zero on the scale 43. The phase of the transferred energy for all positions of the coupling coil on the one side of the zero-position is the opposite of that for the positions on the other side. Accordingly, the coupling zero is the turning point of the cardioid. This zero-position of the coupling coil 40 differs from that for another receiving wave or another distance of the transmitter. In order to avoid mistakes in using the direction finder according to the present invention, that position of the coupling coil 40 which corresponds to the coupling zero is determined by means of a head telephone and then the pointer (not shown) on the axis of revolution of this coil which is adjustable, is put on the zero point of the scale 43. This zero-point then represents the turning point of the cardioide.

Referring to Fig. 3 the wave front WF is assumed to be perpendicular to the ground and the windings of the loop aerial L are symmetrically earthed. The arrow S points in the direction of wave propagation. This figure represents the simplest condition which occurs but infrequently. The diagram of the receiving characteristic here is a perfect lemniscate. This diagram is obtained by plotting the energy received by the loop L at each angular direction of propagation of the incoming wave, the line A—B representing the axis of the loop. Any line drawn from the point O to the curve 100 represents the energy received by the loop when the direction of wave propagation is parallel to the said line. It will be seen that the maximum energy is received when the direction of wave propagation is at right angles to the axis of the loop and that no energy is induced in the loop when the direction of wave propagation is parallel to the axis of the loop.

Thus in this case the axis of the loop will accurately point in the direction of the transmitter when at the condition of zero energy reception in the loop.

In Fig. 4 the wave front WF is again vertical, but the loop winding L is unsymmetrically earthed. The arrow S again points in the direction of wave propagation.

The diagram of the resultant receiving characteristic is represented at 200, the line C—D representing the axis of the loop L. Circle 201 represents the energy received in the loop, due to the so called "aerial effect", that is, the energy due to the unsymmetrical grounding of loop L. Curve 202 represents the energy received in the loop due to pure loop effect as in Fig. 3. The phase of the energy due to the aerial effect is 90° from the electric field of the incoming waves while the phase of the energy due to the loop effect is either 90° or 270° from the phase of the electric field of the incoming waves, depending on which side of the axis C—D the transmitter is located.

So, therefore, on one side of the axis C—D the energies add, since they are in phase and on the other side of the axis C—D they oppose, since they are 180° out of phase. Combining the curves 201 and 202 we obtain curve 200 which represents the resultant energy received in the loop.

It will be seen that lines OE and OF which represent the directions of the wave propagation which give minimum energy reception are both at angles to the loop axis C—D which line C—D should be the direction of the wave propagation giving a minimum in the loop if the direction finder is to be accurate. Therefore, in this arrangement both directions of minimum energy reception are inaccurate.

In Fig. 5 the loop aerial L is shown symmetrically grounded but the wave front WF is at an angle to the direction of wave propagation shown by arrow S and also at an angle to ground. Such inclinations occur for instance, if the electric wave passes from water to land. The inclination can, for instance be produced by absorption by the earth. This absorption is greatest near the ground and less in increasing height. The same effect occurs with ships if the waves come from the side.

The electric field which is inclined as shown by WF can then be divided up into two components at right angles to each other, one vertical and the other horizontal. The vertical component produces no aerial effect on the loop since the loop is assumed to be symmetrically grounded. But the horizontal component, due to the axial breadth or length of the loop produces an aerial effect illustrated by curve 301. It will be seen that this effect is greatest when the direction of wave propagation is parallel to the axis G—H of the loop L and zero at right angles thereto.

Curve 302 represents the energy received in the loop L due to the pure loop effect as in Fig. 3. It will be easily seen that the phase of the energy due to the loop effect is 90° or 270° different in phase from the electric field of the incoming waves depending on which side of the axis G—H the transmitter is located, while the phase of the energy due to aerial effect of the horizontal component is 90° or 270° different in phase from the electric field of the incoming wave depending on which side of the plane of the loop the transmitter is located. Since these two energies are either in phase or 180° out of phase, it is easy to add their effects when in phase and to subtract when out of phase to produce the lemniscate 300 which represents the resultant energy received in the loop L. Lines OI and OJ represent the directions of wave propagation giving zero energy to the loop and it is seen that these directions are both displaced from the axis G—H of the loop L.

This case also shows that the axis of the loop L does not point accurately to the transmitter at either position of zero or minimum energy reception in the loop.

Figure 6:
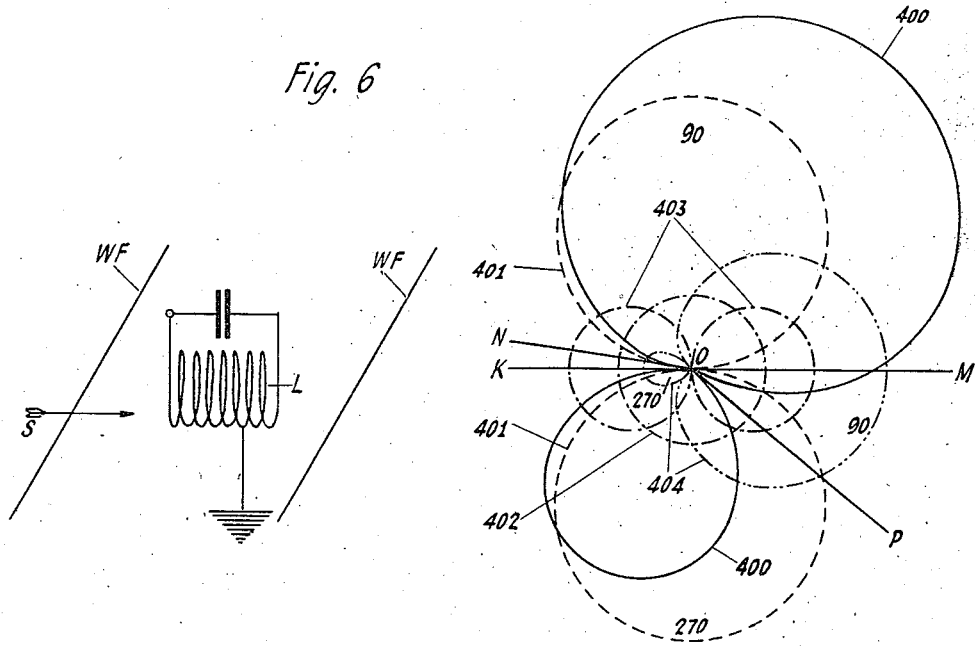

Fig. 6 shows an asymmetrically earthed loop aerial L and an inclined wave front WF, the arrow S representing the direction of wave propagation. Curve 402 represents the energy due to the aerial effect of the vertical component of the inclined wave. Curve 403 represents the energy due to the aerial effect of the horizontal component of the inclined wave. Curve 404 represents the resultant of these two energies. Curve 401 represents the energy due to the pure loop effect. Curve 400 represents the resultant energy due to all the combined effects and is obtained by combined curves 404 and 401. Since all of these energies are either 90° or 270° out of phase with the incoming wave, they either directly add or oppose depending on the position of the transmitter with respect to the loop.

Lines ON and OP represent the directions of wave propagation giving zero energy to the loop and it is clearly seen that these directions are displaced from the axis KM of the loop L.

Therefore, also in this case at both positions of zero energy reception, the axis of the loop L does not point in the true direction of the transmitter.

Figure 7:
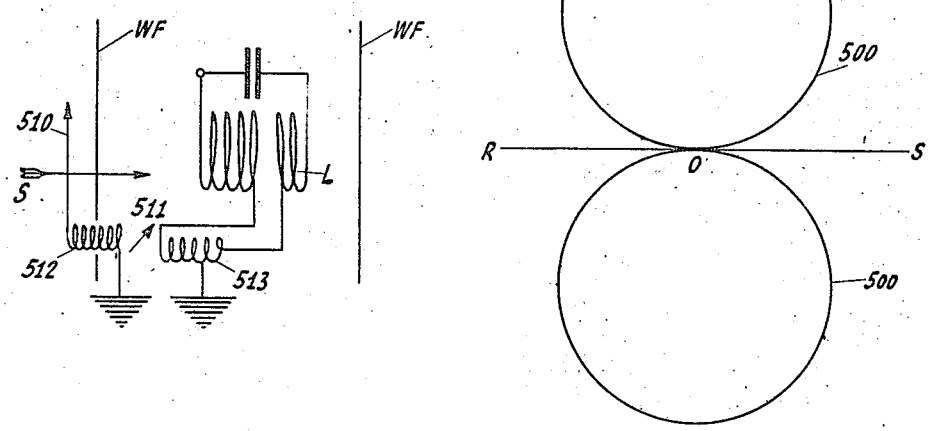

Fig. 7 shows an asymetrically earthed loop aerial L and a vertical wave front WF, the direction of propagation being represented by the arrow S. A compensating undirectional auxiliary aerial 510 is used and is coupled to loop L by the variable coupler 511 composed of coils 512 and 513. This drawing may be compared with Figure 4 in which the aerial effect was not directive and had the phase 90° relative to the incoming wave. In order to compensate this effect, the coupling between loop aerial L and auxiliary aerial 510 should be so adjusted that the auxiliary aerial 510 induces an effect in the loop L equal to the above aerial effect but with the phase 270°. Hereby the disturbing aerial effect is compensated for all directions and the result is a perfectly symmetrical lemniscate 500 and two exactly pointing minima OR and OS coinciding with the axis RS of loop L. It is obvious that in the case of vertical wave front the asymmetry of the loop aerial can very easily and very accurately be compensated by the special auxiliary aerial.

Fig. 8 can be compared with Figure 5. It shows a symmetrically earthed loop aerial L and an inclined wave front WF and the arrow S pointing in the direction of wave propagation, as in Fig. 5. The one receiving minimum has been made sharp and exact by means of an auxiliary aerial 610. As in Fig. 5 the aerial effect caused by the horizontal component of the inclined electric field has the shape of a lemniscate 601. If an electro-motive force, which has the same value as the maximum voltage induced in the loop due to the aerial effect of the horizontal component of the inclined electric field but which has a 90° phase relation to the incoming electric wave, is transferred from the undirectional auxiliary aerial 610 to the loop aerial L, this effect due to auxiliary aerial 610 and represented by curve 602 is combined with the aerial effect illustrated by curve 601 to form a cardioid 603. This transfer of energy from the unidirectional auxiliary aerial 610 to the loop aerial L is accomplished by means of variable coupler 611 which comprises coils 612 and 613. Curve 603 is then combined with curve 604 which illustrates the energy induced in loop L due merely to loop effect to give curve 600 which represents the resultant of all the combined energies received by the loop L.

As shown the direction TO of zero energy reception coincides with the axis TU of the loop L. This shows that the axis of the loop will point accurately to the transmitting station when one condition of zero energy reception is obtained. The direction VO of zero energy reception, however, is quite different from the axis TU of the loop L.

So that the true direction of a transmitter on the right side of the loop L can also be obtained, the sense of the coupling between coils 612 and 613 may be reversed, care being exercised to keep the same coefficient of coupling. The case illustrated by Fig. 8 is the one which occurs most in practice as the loop aerials are constructed as nearly symmetrical as possible and the disturbing aerial effect is caused chiefly by an unhomogeneous inclined electric field.

Fig. 9 illustrates the case of an asymmetrically earthed loop aerial L, WF representing an inclined wave front and the arrow S the direction of wave propagation. The diagram of the asymmetrically earthed loop aerial L and the resulting diagram accurately correspond to those of Figure 8. It shows that even the aerial effect due to the vertical component of the inclined electric field added to the disturbing effect resulting from the horizontal component of the inclined electric field, can be eliminated by the same means for the one minimum or the other.

Fig. 10 shows diagrammatically a loop aerial L in a position at right angles to the positions shown in the prior figures. Its diagram is the small lemniscate 801, the energy induced in the loop L having the phase 90° or 270° with respect to the incoming wave depending on which side of the loop axis a—b the transmitter is located. The effect of tuned auxiliary aerial 810 is the transference of energy of approximately the phase 270° to the loop circuit by means of coils 812 and 813 of variable coupler 811. The phase can always be adjusted exactly to 270° by means of the tuning condenser 814 of the auxiliary aerial 810 by adjusting this condenser either larger or smaller, as required by resonance. The amount of coupling between coils 812 and 813 is so chosen that the voltage induced in the coil 813 is equal to the maximum voltage induced in the loop aerial L, that is, the voltage induced in the loop L when the plane of the loop lies in the direction of the transmitter. The resultant is a cardioid 800 pointing to the transmitting station. The pointer 815 on the movable coil of the variable coupler 811 at the time points to a color, for instance, red on a fixed scale 43 (see also Fig. 2). The adjusting device 2 of the frame aerial 1 (Fig. 1) has mounted thereon a red arrow and a green one. If the greatest audibility is obtained when the pointer 815 is on the red marked part of the scale 43, the direction of the transmitter is given by the red arrow on the adjusting device 2 (Fig. 1).

It is thus seen that maximum audibility is obtained when the axis of the loop L coincides with line a—b and the plane of the loop points in the direction O—X.

Fig. 11 shows a case similar to that of Figure 10, the sense of coupling between coils 812 and 813 being reversed. So the cardioid points to the direction OY opposed to that of the transmitter, that is, the receiving is nearly equal to zero. The receiving operator sees from pointing of pointer 815 to the green color that this color is out of the question for the reading of the real direction.

The Figs. 3 to 11 are constructed theoretical examples for the most favorable cases in that the phases of the energy received due to the loop effect and due to the aerial effect are exactly 90° or 270° different in phase from the field of the transmitter. Of course, small differences of phase occur in practice for different processes, but these differences do not materially alter the above described examples. It is only necessary to alter the phase, for instance, by correcting the syntony of the loop aerial or auxiliary aerial. The minima of the lemniscate not determining the real direction are furthermore altered by these differences of phase, small in comparison with ± 180°, that is, these minima are in practice mostly unsharp.

It may be seen from the preceding that the ship direction finder according to the present invention is a simple and perfect apparatus. As the receiving vacuum tubes work with damping reduction and coupling reaction, the audibility is as great as possible. The working of the apparatus is very simple as only one auxiliary aerial is used. The lemniscate can be corrected by means of this untuned auxiliary aerial if it is very loosely coupled to the frame aerial. The cardioid can be generated by means of the tuned auxiliary aerial.

Having described my invention, what I claim is:

1. In a directional antenna system, a non-directional antenna and a rotatable directional antenna, variable coupling means for said antennæ for adjusting the coefficient and sense of coupling between said antennæ to obtain a true pointing minimum at any desired wave length, indicating means for said rotatable antenna and indicating means for said coupling means cooperating with said first named indicating means for indicating the true pointing minimum.

2. In a directional antenna system, a rotatable directional antenna and a separate non-directional antenna, variable coupling means for said antennæ for adjusting the coefficient and sense of coupling between said antennæ to obtain a true pointing minimum at any wave length and adjustable indicating means on said coupling means for indicating the coupling between said antennæ for any wave length, and indicating means on said rotatable antenna cooperating with said first named indicating means to denote the true pointing minimum.

3. In a directional antenna system, a directional antenna and a non-directional antenna, variable coupling means for said antennæ for varying the coefficient and sense of coupling between them, means for rotating said directional antenna and indicating means for indicating the position of said directional antenna, indicating means for said variable coupling means for indicating the coefficient and sense of coupling between said antenna, and means comprising corresponding scales associated with said indicating means to determine the relation between the position of the directional antenna and coefficient and sense of coupling for the true pointing minimum.

4. In a directional radio system, a non-directional aerial, a loop aerial and means for loosely coupling said non-directional aerial to said loop aerial, a plurality of tubes in cascade connected to said loop, means for back coupling said tube circuits to said loop, said means comprising variable and selective condenser means for adjustably connecting said back coupling means to either of two of the plate circuits of said tubes.

5. In a directional radio system, a non-directional aerial, a loop aerial and means for coupling said non-directional aerial to said loop, said means comprising means for varying the coefficient and sense of coupling between said aerials, a plurality of vacuum tubes connected in cascade to said loop aerial, means for back coupling said tubes to said tube circuits to said loop, said means comprising variable and selective condenser means for adjustably connecting said back coupling means to either of two of the output circuits of said tubes.

6. In a directional radio system, a non-directional aerial, a loop aerial and means for coupling said non-directional aerial to said loop, said means comprising a variable loose coupling having a coil in the antenna circuit and a coil connected substantially midway between the ends of said loop, an amplifier circuit comprising a plurality of vacuum tubes in cascade the input circuit of said amplifier being connected to the central point of said loop and to one end of the loop, a feed back connection connected to the other end of said loop comprising variable and selective condenser means for connecting said feed back to either of two of the plate circuits of said tubes.

7. In a directional antenna system, a rotatable directional antenna, a non-directional antenna, means comprising a variable coupling between said antennæ for obtaining a plurality of sharply defined minima, and means, including an indicator on said rotatable directional antenna, and an indicator on said coupling means, so correlated to said first named indicator that the true pointing minimum may be read from said first named indicator, for indicating the true pointing minimum.

8. In a directional antenna system a non-directional antenna, a separate rotatable directional antenna, variable coupling means including means for rotating the sense of direction of said system, for said antennæ for adjusting the coefficient and sense of coupling between said antennæ to obtain a true pointing minima at any desired wavelength, indicating means for said rotatable antenna, and indicating means for said coupling means cooperating with said first named indicating means to indicate the true pointing minimum.

9. The method of radio direction finding with a directional loop aerial and a separate non-directional aerial which consists in loosely coupling the non-directional aerial to the directional aerial, tuning the loop aerial to the desired wave length, combining the loop receiving effects with a small component from said non-directional aerial while in an untuned condition, determining the coupling necessary to produce substantially perfect null points, one of which lies along the axis of the loop, and rotating the coupling coil to change the sense of direction of the system to determine the true pointing minimum.

10. A method of radio direction finding with a directional loop aerial and a separate non-directional aerial loosely coupled thereto which consists in combining the loop receiving effects with a small component from said non-direction aerial while in an untuned condition and determining the coupling necessary to produce substantially perfect null points, substantially tuning the non-directional aerial to secure a cardioid directional system and alternately changing the direction of coupling to determine the sense of direction.

11. A method of radio direction finding with a directional loop and a separate non-directional antenna loosely coupled thereto which consists in establishing a minimum coupling between the loop and the non-directional antenna, adjusting said minimum to produce substantially perfect null points for a given signal, substantially tuning the non-directional aerial to secure a cardioid directional system, varying the coupling and reversing its direction to determine the sense of direction.

12. In direction finding the method of correcting deviation of the null points caused by a distorted wave front on a loop aerial having appreciable width which consists in tuning the loop aerial to the desired wave length, supplying energy from an auxiliary aerial while in an untuned condition and combining enough of said energy with the energy induced in said loop aerial by said distorted wave front to shift one of the null points of the loop energy curve to a position along the axis of the loop.

13. The method of radio direction finding with a loop aerial of appreciable width in which out of phase currents are caused by a distorted wave front which consists in, tuning the loop aerial to the desired wave length, supplying energy from an auxiliary non-directional aerial while in an untuned condition and transferring a component of said energy to said loop circuit so that the current in said loop circuit will be zero when its magnetic axis points at the station to be received.

14. In a directional antenna system, a loop aerial comprising a pair of electrically equal portions, a connection between said portions, a rotatable inductance in said connection, a non-directional aerial, means for coupling said non-directional aerial to said loop aerial comprising an inductance in said non-directional aerial coupled to said rotatable inductance, tuning means for said loop aerial, an amplifier system comprising a plurality of impedance coupled vacuum tube amplifiers in cascade arrangement, a connection between the mid point of said rotatable inductance and the filament electrode of one of said vacuum tubes, a connection between one end of said loop aerial and the grid electrode of said last named tube, capacitive means for coupling the other end of said loop aerial to the plate electrode of one of said vacuum tube amplifiers, a local oscillator, coupling means between said oscillator and said loop circuit and indicating means associated with said amplifier.

AUGUST LEIB.

CERTIFICATE OF CORRECTION.

Patent No. 1,685,821.                    Granted October 2, 1928, to

AUGUST LEIB.

It is hereby certified that error appears in the printed specification of the above numbered patent requiring correction as follows: Page 2, line 76, for the word "valves" read "values"; and that the said Letters Patent should be read with this correction therein that the same may conform to the record of the case in the Patent Office.

Signed and sealed this 7th day of May, A. D. 1929.

M. J. Moore,
Acting Commissioner of Patents.

(Seal)